4 Sheets—Sheet 1.

J. A. MEHLING.

STREET CAR.

No. 11,346. Reissued June 20, 1893.

Witnesses
E. B. Gilchrist
C. H. Worm

Inventor.
John A. Mehling
by Legget & Legget
his Attorneys

4 Sheets—Sheet 2.

J. A. MEHLING.

STREET CAR.

No. 11,346. Reissued June 20, 1893.

Witnesses:
E. B. Gilchrist
C. Kenny

Inventor:
John A. Mehling
By Legget & Legget
his Attorneys

4 Sheets—Sheet 3.

J. A. MEHLING.

STREET CAR.

No. 11,346. Reissued June 20, 1893.

Witnesses.
E. B. Gilchrist
C. Young

Inventor:
John A. Mehling
By Legget & Legget
his Attorneys

4 Sheets—Sheet 4.

J. A. MEHLING.

STREET CAR.

No. 11,346. Reissued June 20, 1893.

Witnesses
E. B. Gilchrist
C. Crosby

Inventor
John A. Mehling
By Leggett & Leggett
his Attorneys.

UNITED STATES PATENT OFFICE.

JOHN ANDREW MEHLING, OF CLEVELAND, OHIO, ASSIGNOR OF ONE-HALF TO S. D. DODGE, OF SAME PLACE.

STREET-CAR.

SPECIFICATION forming part of Reissued Letters Patent No. 11,346, dated June 20, 1893.

Original No. 481,800, dated August 30, 1892. Application for reissue filed February 2, 1893. Serial No. 460,616.

*To all whom it may concern:*

Be it known that I, JOHN ANDREW MEHLING, a citizen of the United States, residing at Cleveland, in the county of Cuyahoga and State of Ohio, have invented certain new and useful Improvements in Cars; and I do hereby declare the following to be a full, clear, and exact description of the invention, such as will enable others skilled in the art to which it appertains to make and use the same.

In order to meet the demands of the public and to provide the comforts which are generally regarded as necessities by the patrons of street-railways, the companies are now obliged to provide two complete equipments of cars—to wit, the open cars, which are used in the summer, and the closed cars, which are used the rest of the year.

The principal object of my invention is to provide a car which may readily be converted from a closed car to an open car, and vice versa, whereby the cost of the equipment and maintenance of the rolling-stock of a street-railway may be reduced in a large degree.

Another object of my invention is to provide a car into and from which passengers may pass in less time and with less discomfort to themselves and their fellow-passengers than with the cars now in general use.

These are the principal objects of my invention, which consist in the construction and combination of parts hereinafter described, and pointed out definitely in the claims.

Figure 1:
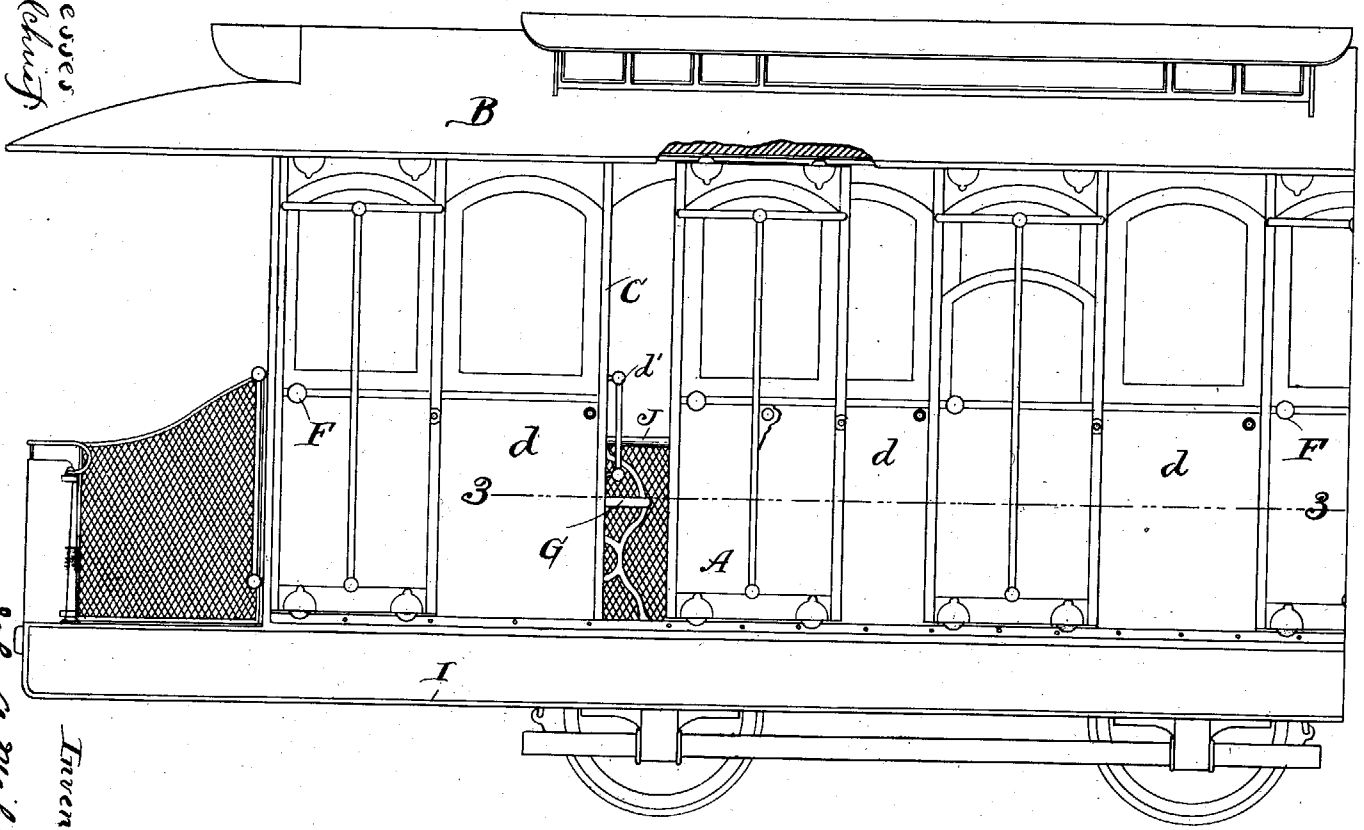
Figure 2:
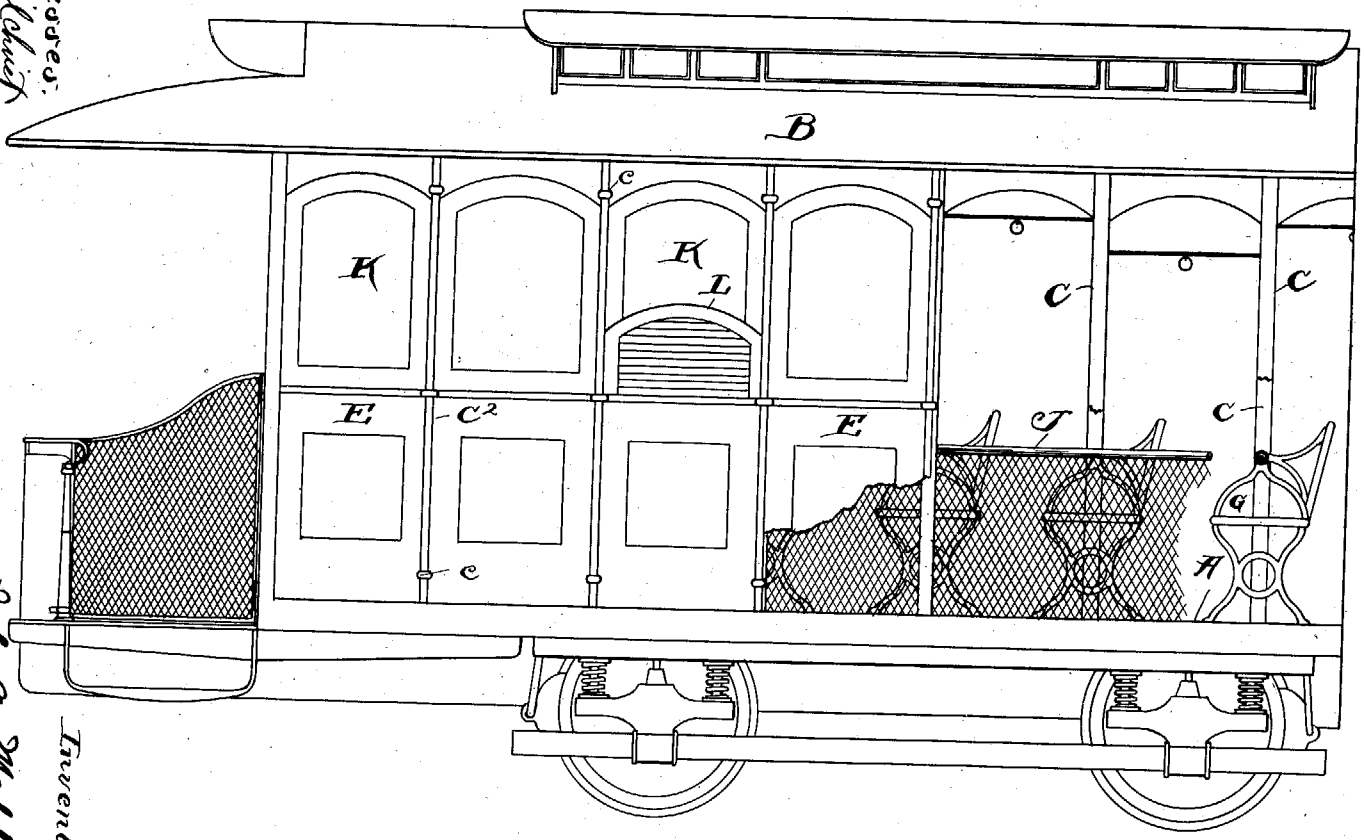
Figure 3:
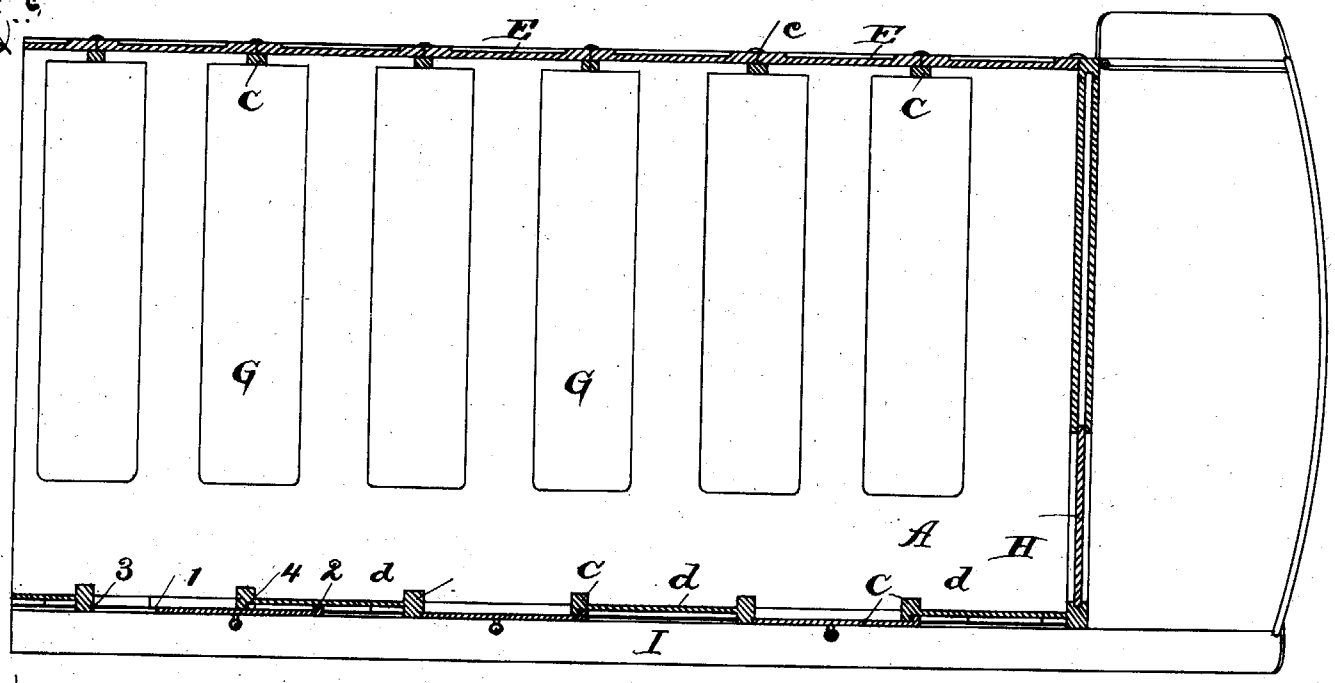
Figure 5:
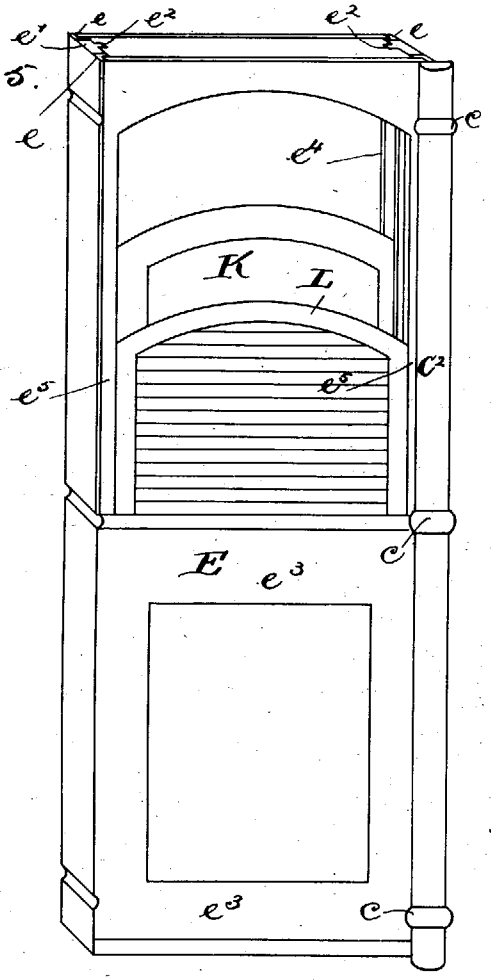
Figure 4:
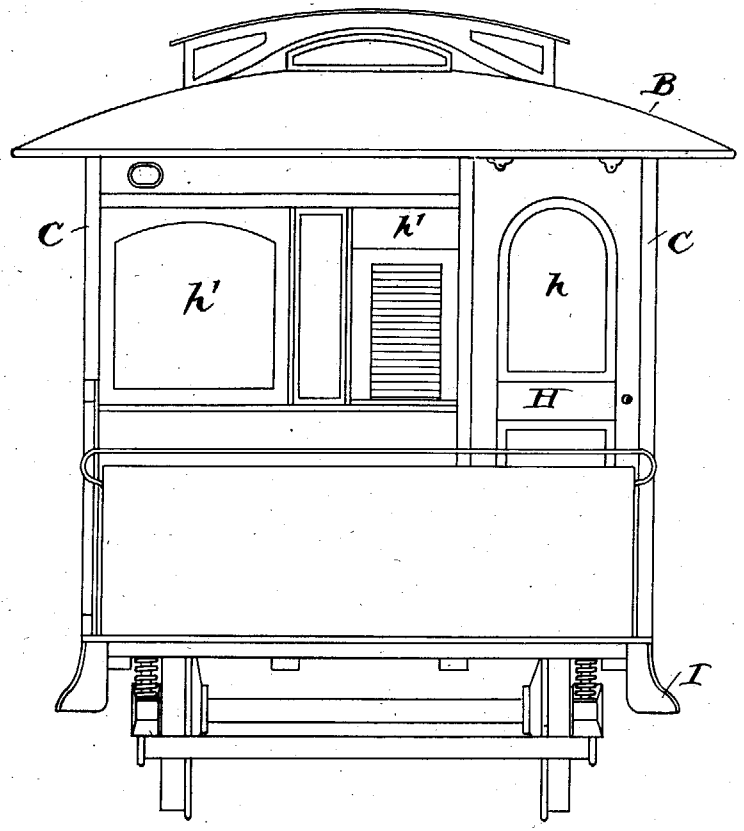

In the accompanying drawings, Figures 1 and 2 are elevations of opposite sides of a street-car embodying my invention. Fig. 3 is a horizontal section of the car in the plane indicated by line 3—3 of Fig. 1, showing the relative arrangement of the seats, the aisle, &c. In these three figures just described a part only of the car is shown, the rest being supposed to be broken away for the purpose of reducing the size of the figures. Fig. 4 is an end elevation of the car, and Fig. 5 is a perspective view of one of the removable panels.

In all large cities the street-railways are for the most part constructed with double tracks, and the cars run in one direction on one track and in the opposite direction on the other track. A car constructed as hereinafter described is of greatest utility on roads of this character when the two tracks are connected by a loop or when a turn-table is provided at the ends of the line.

Referring again to the drawings, A represents the floor of the car, and B the roof.

C C represent upright posts arranged at intervals along the sides of the car, extending from the floor to the roof and secured firmly to both, thereby supporting the roof.

E and E represent panels, which extend from the floor to the roof and are wide enough to extend from the middle line of one post to the middle of the next post. These panels are secured to the posts by bolts *c*, and when a sufficient number of such panels are so secured to the posts they close the entire side of the car on which they are placed.

Either side of the car or both sides might, if desired, be constructed in the above-described manner, and if both sides are so constructed all the panels may be removed, leaving nothing at the sides except the upright posts, substantially like the open cars in ordinary use. I prefer, however, to construct only that side of the car which in traveling runs next to the other track with removable panels, as above explained, for the reason that I propose to put one or more sliding doors D in the opposite side of the car, in order that even when the car is closed for winter use these doors may, when desired, be used by the passengers in getting into or from the car. When this side of the car is constructed, as shown in the drawings, with a door in every other space between posts, it is, I think, unnecessary to have the intermediate panels *d* removable, because when all the doors are open on that side and all the panels on the other side are removed the car is sufficiently open to give free circulation of air through it. It is, moreover, in my opinion, better that they should not be removable on this side, because when permanently secured in place they brace that side of the car and by making it stiffer render the action of the doors more smooth and certain.

I employ sliding doors, which are hung on suitable rollers either from the top or bottom, or both. These doors are arranged to slide outside of the stationary panels *d*, and each is provided with a vertical hand-rail *d'*, which passengers riding on the foot-board I when the car is being used open may take hold of. These doors are provided with a latch F of any suitable construction, adapted to hold the doors closed; but I believe the car will be safer if the handles for operating the latch are placed only on the outside of the door, because thereby the conductor may, if he chooses, when the car is crowded open any of the side doors and permit a passenger to pass through it into or from the car; but there will be no danger of passengers in the car opening the door and stepping out before the car has stopped. A foot-board or step I extends entirely along the outside of the car, as shown, from one platform to the other on that side which is farthest from the other track.

In order to make it possible to close the doors tightly, so that when closed very little air will be admitted at the sides, I bevel the vertical edge 1 of the door and provide on the back side of the door a beveled vertical shoulder 2. The two posts C C between which the door extends are provided with vertical edges 3 and 4, with which the beveled surfaces 1 and 2 on the door engage.

An aisle extends the entire length of the car next to that side thereof on which the doors are placed. The seats G extend transversely from this aisle to the other side of the car, as shown in Fig. 3. The ends of the car are provided with doors H, placed at one side of the center and in line with the aisle. These doors are provided with windows *h*, which may be lowered, and the ends of the car are likewise provided with windows *h'*, which may be removed or lowered when the car is turned into an open car.

When a car constructed as described has its panels E secured in place and is being used as a closed car, its seating capacity is considerably greater than that of the closed cars of ordinary construction with seats along the sides. At the same time the aisle room is sufficient to permit at least as many passengers to stand comfortably in it for the reason principally that it is not in part occupied by the feet of the passengers who are sitting. When the aisle is clear, passengers can quickly get out of the car through the end doors, because they have a free passageway unobstructed by the passengers' feet. If the car is crowded time may be saved by letting them into and off the car through the side doors.

To change the car to a substantially open car, the panels are removed, the side-doors are fastened back, and the end doors and windows opened. A wire guard J of ordinary construction may be secured along that side of the car next the others rails to prevent passengers from getting onto or from the car on that side. In Fig. 2 a broken section of the wire guard is shown to indicate its position when secured to the car.

The removable panels E are shown in Fig. 5 to be of the following construction: Upon each side of each panel are two vertical angle-irons *e*, secured together and to an interposed strip of wood *e'*, having a tongue $e^2$, by rivets. Across the top and bottom are two flat iron plates, which are riveted to the angle-irons. This makes a metallic frame, which prevents the panels from warping during the time they are removed from the car. The lower part of the panels are closed on both sides by woodwork $e^2$ $e^3$, which extends from one side of the panel to the other and is secured to the angle-irons. In the upper part of the panels are a vertically-movable window K and blind L. The window and blind are separated by the tongue $e^2$, and the window is held in by two vertical strips $e^4$, which are secured to the angle-irons, and the blind is held in place by two similar strips $e^5$ $e^5$, secured to the other angle-irons.

Any sort of bolts *c* may be employed to fasten the panels E to the posts C; but I prefer to employ bolts having a T-head, as shown in Fig. 5. The shank of the bolt lies in a groove in the edges of the panels. The panels rest on the floor of the car and the T-heads of the bolts set over the edges of both panels. A vertical strip of molding $C^2$ is secured to the edge of one panel, so that it overlaps the edge of the adjacent panel and hides the space between the two panels.

I would have it understood that my invention broadly embraces a street-car having seats arranged transversely of the car with the ends of the seats, at one side of the car separated a suitable distance from that side of the car to form an aisle extending from end to end of the car.

I am aware that cars have heretofore been made with an aisle on one side extending the entire length of the car-body but, in every instance, the aisle was formed by a partition, either sliding or stationary, between the seats and the respective side of the car, and I desire to have it, therefore, understood that I do not broadly claim a car having an aisle upon one side extending the entire length of the car-body.

Having thus described my invention, what I claim as new, and desire to secure by Letters Patent, is—

1. A street-car having seats arranged transversely of the car, a foot-board on one side, an aisle at that side extending practically or approximately the entire length of the car-body, and one or more doors leading from the foot-board into said aisle, the aisle being formed by the one end of the seats on one side and the side-wall of the car-body on the other side, without the interposition of a partition or dividing wall substantially as set forth.

2. A car having a side wholly or partially removable, and, to that extent, forming a convertible open and closed car, seats arranged transversely of the car, said seats, at one end, being separated such a distance from one side of the car as to form an aisle at that side, and one or more doors leading to said aisle, substantially as set forth.

3. A street-car having a side wholly or partially removable and to that extent forming a convertible open and closed car, a foot-board along one side, seats arranged transversely of the car, said seats, at one end, being separated such a distance from the side of the car at which the foot-board is located, so as to form an aisle at that side, and one or more doors in said side, substantially as set forth.

4. A convertible open and closed street-car having one side which is composed of vertical posts and removable panels, a foot-board along one side, one or more sliding doors in the side on which the foot-board is placed, an aisle next to said side and extending from one end to the other, and seats arranged transversely on the floor and extending from the aisle to the other side of the car, substantially as set forth.

5. In a convertible open and closed street-car, the combination of vertical posts arranged along one side of the car, removable panels having metallic frames, and bolts for securing said panels to said posts, substantially as set forth.

6. A panel for a convertible street-car having sides, which are formed of two vertical angle-irons and an interposed wood strip having a vertical tongue, metallic cross-pieces at top and bottom, wood facings to the lower parts of said panels, and a vertically-movable window and blind adapted to close the upper part of said panel and lying on opposite sides of said wood strip, substantially as set forth.

7. In a street-car, a sliding door in one side, having beveled vertical edges, combined with vertical posts having inclined vertical edges adapted to engage with the vertical edges on the door, substantially as and for the purpose specified.

In testimony whereof I sign this specification, in the presence of two witnesses, this 3d day of January, A. D. 1893.

JOHN ANDREW MEHLING.

Witnesses:
C. H. DORER,
ELLA E. TILDEN.